United States Patent [19]

Gordon

[11] Patent Number: 4,608,663

[45] Date of Patent: Aug. 26, 1986

[54] COMPUTER NETWORK FOR USING A COMMON PERIPHERAL DEVICE

[75] Inventor: William E. Gordon, Short Hills, N.J.

[73] Assignee: Wolsten's Computer Devices, Inc., East Orange, N.J.

[21] Appl. No.: 528,253

[22] Filed: Aug. 31, 1983

[51] Int. Cl.$^4$ .............................................. G06F 13/22
[52] U.S. Cl. .................................................. 364/900
[58] Field of Search ... 364/200 MS File, 900 MS File

[56] References Cited

U.S. PATENT DOCUMENTS

| | | |
|---|---|---|
| 3,399,469 | 9/1968 | Nisbet . |
| 3,609,227 | 9/1971 | Kuljian . |
| 3,784,979 | 1/1974 | Friedman et al. . |
| 3,879,710 | 4/1975 | Maxemchuk et al. ............... 364/200 |
| 3,881,174 | 4/1975 | Barnich ................................ 364/200 |
| 3,949,371 | 4/1976 | Pederzini ............................ 364/200 |
| 4,004,277 | 1/1977 | Gavril ................................. 364/200 |
| 4,034,347 | 7/1977 | Probert, Jr. ......................... 364/200 |
| 4,050,165 | 9/1977 | Yamauchi et al. . |
| 4,079,365 | 3/1978 | Yamauchi . |
| 4,130,864 | 12/1978 | Schlotterer ......................... 364/200 |
| 4,363,033 | 12/1982 | Lovely . |

Primary Examiner—Thomas M. Heckler
Attorney, Agent, or Firm—Thomas Adams

[57] ABSTRACT

A non-random network can connect a common peripheral device to one of a plurality of computers. Each of these computers has a request line for providing a request signal. The network has a plurality of switching devices, each coupled to the common peripheral device and to a corresponding one of the computers. Each of these switching devices is operable in response to a select signal being applied thereto to transfer data between its corresponding one of the computers and the common peripheral device. The network also has a scanner coupled to the plurality of switching devices for operating them in a predetermined order by sequentially applying to them the select signal. This scanner is operable to cease sequencing and to continue applying the select signal to said switching devices to switch a selected one of the computers in response to a persistence of the request signal from the selected one of the computers. After removing the select signal the scanner can restore the select signal to the same one of the switching devices only after each of the other ones of the switching devices has had temporarily applied to it by the scanner the select signal.

10 Claims, 4 Drawing Figures

COMPUTER NETWORK FOR USING A COMMON PERIPHERAL DEVICE

BACKGROUND OF THE INVENTION

The present invention relates to networks for connecting peripheral devices such as memory and printers to one of a plurality of computers.

With the rising popularity of small home computers it has become desirable to tie computers into a simple network for various purpose, e.g. for teaching computer operating principles in a classroom setting. Under such circumstances it is desirable to enable a plurality of small computers to use a commmon printer and disk drive. This common usage can dramatically decrease cost and improve the reliability of the system. It is also desirable under such circumstances to enable an instructor to gain control of the printer and disk drive or to monitor the video output from a particular student while giving him audible instructions.

It is known, (for example, U.S. Pat. No. 3,881,174) to use a central computer which may address a plurality of peripherals. A disadvantage with these known systems is the requirement that a peripheral must request an interrupt and then await an interrupt acknowledge. These systems are complicated because the connections may occur randomly which requires a form of two-way communication between a central and peripheral devices. A complicated decision must be made as to which connection will be made first either due to some predetermined hierarchy or due to an early request.

It is also known to employ teaching systems having a teacher console for receiving responses to questions manually entered by students at their separate stations. However, these systems are not concerned with the data processing considerations necessary to allow a common peripheral such as a disk drive or printer to service a plurality of computers. Time division multiplexing is also known as a technique wherein a predetermined time slot is allotted to one of various signal sources. However, these systems do not permit one source to stop the multi-plexing and use the communications lines continuously.

Accordingly, there is a need for an improved computer network system which will allow the linking together of the foregoing equipment.

SUMMARY OF THE INVENTION

In accordance with the illustrative embodiment demonstrating features and advantages of the present invention, there is provided a network for connecting a common peripheral device to one of a plurality of computers. Each of these computers has a request line for providing a request signal. The network has a plurality of switching means, each coupled to the common peripheral device and a corresponding one of the computers. Each of the switching means is operable in response to a select signal being applied thereto to transfer data between its corresponding one of the computers and the common peripheral device. The network also has a scanning means coupled to the plurality of switching means for operating them in a predetermined order by sequentially applying to them the select signal. This scanning means is operable to cease sequencing and to continue applying the select signal to the switching means to switch a selected one of the computers in response to a persistence of the request signal from the selected one of the computers. After removing the select signal, the scanning means is operable to restore the select signal to the same one of the switching means only after each of the other ones of the switching means has had temporarily applied to it by the scanning means the select signal.

Also in accordance with a related method of the same invention, a common peripheral device can be non-randomly connected to one of a plurality of computers. Each of the computers has a request line for providing a request signal. The method includes the step of sequentially sensing the request line of each of the computers in a predetermined order. Another step is stopping the sequential sensing when a next observed one of the computers issues the request signal and ignoring the request signal of every other one of the computers. Another step is connecting the next observed one of the computers for at least the duration of its request signal to the common peripheral. Another step of the method is continuing the sequential sensing of the request line of each of the computers, stopping in sequence once for every one of the computers issuing a request signal before again sensing the request line of the next observed one.

By applying such apparatus and method an improved non-random computer network is achieved. In a preferred embodiment, a clock drives a counter/decoder to provide a strobe signal on one of "n" lines. These scanned lines are used to close sequentially switches that connect one of a plurality of computers to a bus line leading to a peripheral interface. When a computer is connected to the bus it can issue a request signal which halts the scanning. Thus the computer being serviced is able to continue receiving service until it relinquishes its request. The next computer service is preferably the next computer in the predetermined scanning sequence. By using such a simple scanning technique the scanning device can be relatively "unintelligent." This feature greatly reduces cost and improves reliability.

In this preferred embodiment the scanner will index to the next computer only after a predetermined delay interval has elapsed after the expiration of the request signal from the computer under service. This allows the computer being serviced a brief interval to regain access to the peripheral so that it need not wait for all the other computers to be serviced merely because of a pause in its request signal.

In a highly preferred embodiment, the apparatus is packaged as an educational system wherein an instructor has a selector switch for monitoring video outputs from each student computer. The instructor may also select any student computer and provide an audio input to it. In this preferred embodiment, the instructor may use one of the scanned computers and for this reason he may be given a manual override switch which forces the scanning to lock onto his computer. Thus, the instructor can gain complete control of the peripherals.

BRIEF DESCRIPTION OF THE DRAWING

The above brief description as well as other objects, features and advantages of the present invention will be more fully appreciated by reference to the following detailed description of a presently preferred but nonetheless illustrative embodiment in accordance with the present invention when taken in conjunction with the accompanying drawings, wherein.

DETAILED DESCRIPTION OF THE PREFERRED EMBODIMENT

Figure 1:
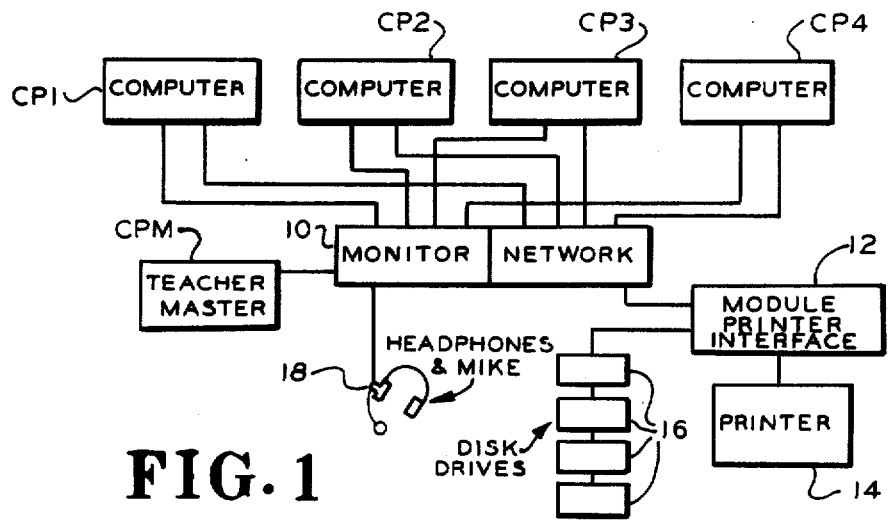
FIG. 1 is an overall block diagram showing a non-random network according the principles of the present invention.

Referring to FIG. 1 a non-random network 10 is illustrated. This block diagram shows the use of four computers CP1, CP2, CP3 and CP4 connected to a scanning network and monitor 10. It will be appreciated that more or fewer than four computers may be used and that any small computer such as an Apple home computer may be used. Network 10 connects to common peripheral, namely a module printer interface 12 which is a commercially available interface allowing a single computer, such as computer CP1, to connect to and use printer 14 and disk drives 16. An additional computer CPM, which may be used exclusively by an instructor, is connected to network 10 in a manner similar to computer CP1–CP4. Master computer CPM many have associated with it headphones and microphone 18 to form a master console, connected and used as decribed hereinafter.

Figures 2, 3:
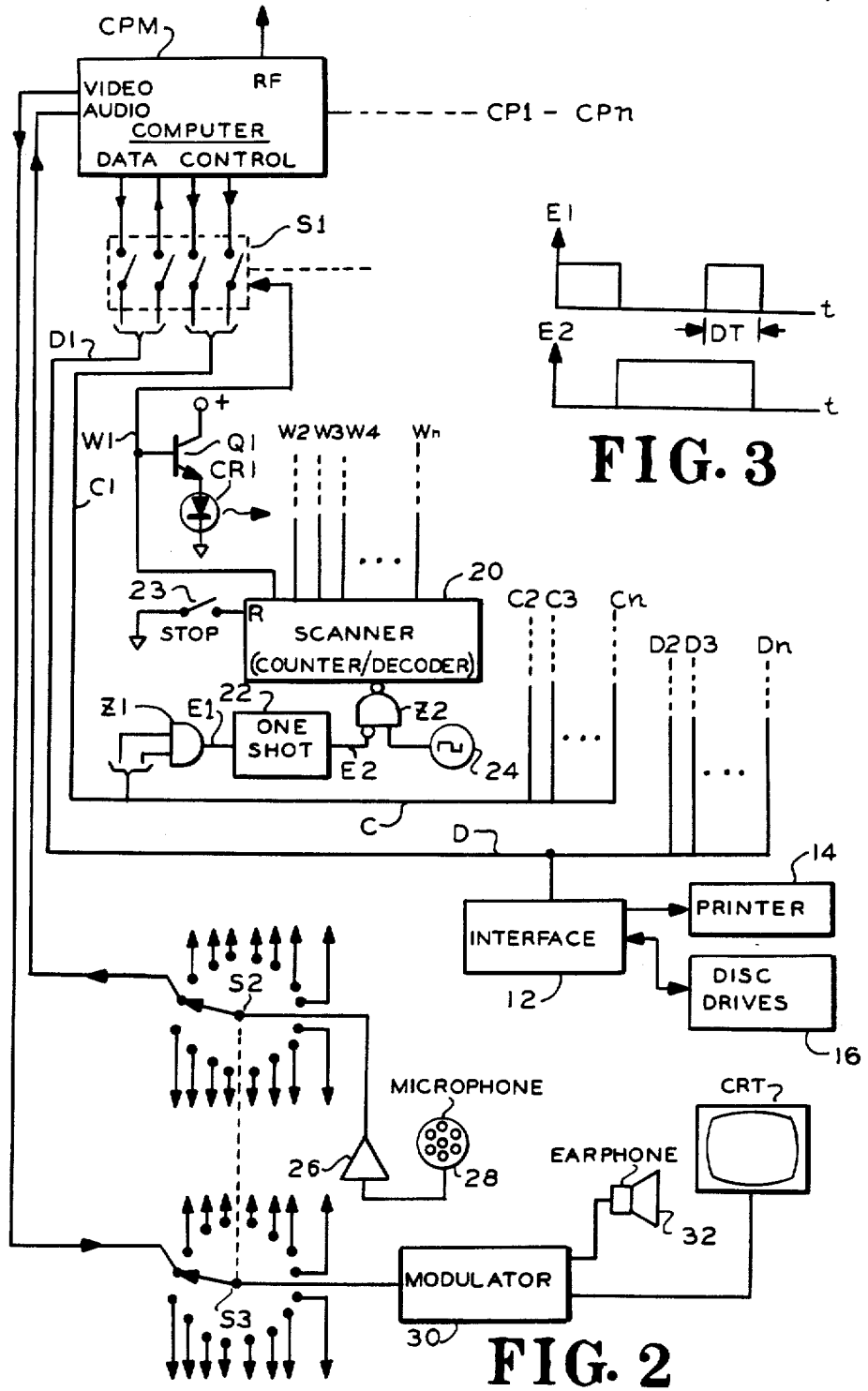
FIG. 2 is a more detailed diagram of the system of FIG. 1.
FIG. 3 is a timing diagram associated with the diagram of FIG. 2.

Referring to FIG. 2 a scanning means is shown herein as scanner 20 which employs a counter and decoder means, decribed in further detail hereinafter. Scanner 20 issues strobe lines on one of the "n" lines W1–Wn as timed by an internal clock which may be stopped in a manner to be described presently. One technique for stopping the scanning of scanner 20 is by closing manual override switch 23, thereby forcing the scanner to provide a strobing signal only on line W1. Each of the lines W1–Wn has associated with it an NPN transistor Q1 which is rended conductive when its line is energized so that emitter current flows through light emitting diode CR1 connected in the emitter circuit of transistor Q1. The collector of transistor Q1 is connected to positive potentialm the base to line W1.

The lines W1–Wn each issue a select signal which is applied to a plurality of switching means such as switch assembly S1. Switches S1 may be an integrated bilateral switch such as type 4066 manufactured by National Semiconductor. The illustrated switches S1 have two pairs of switches. The left pair is referred to as a data means and the right pair is referred to as a control means which pairs connect through lines D1 and C1, respectively, to busses D and C, respectively. Lines D1 and C1 connect through switches S1 to the data and controls lines, respectively, of the computer such as computer CPM.

The two request lines of bus C connect to separate inputs of NAND gate Z1 whose ouput E1 connects to the input of a delay means one shot 22. The output E2 of one shot 22 connects to one input of gate Z2 whose other input connects to the output of clock 24. The bus lines C and D are connected by the respective lines C2–Cn and D2–Dn through switches similar to switches S1 to the data and control terminals of the other computers CP1 through CPN previously decribed in connection with FIG. 1. Also that bus line line D is shown connected through interface 12 to printer 14 and disk drives 16.

The instructor's master console may include audio selector switch S2 whose rotary wiper is connected to the output of audio amplifier 26, driven by microphone 28. Switch S2 may connect the latter two devices to any one of a plurality of audio input of computers CPM, CP1 through CPN. Also included in a master console is a video selector switch S3 whose rotary wiper connects to the input of a modulator 30. Modulator 30 is a commercially available modulator for converting video into a conventional modulated television signal which may then be applied directly to television monitor CRT. The subcarrier audio received by modulator 30 is separated out and applied to earphone 32. The input of modulator 30 may be connected through switch S3 to any one of the video outputs of the computers CPM, CP1 through CPN.

Figure 4:
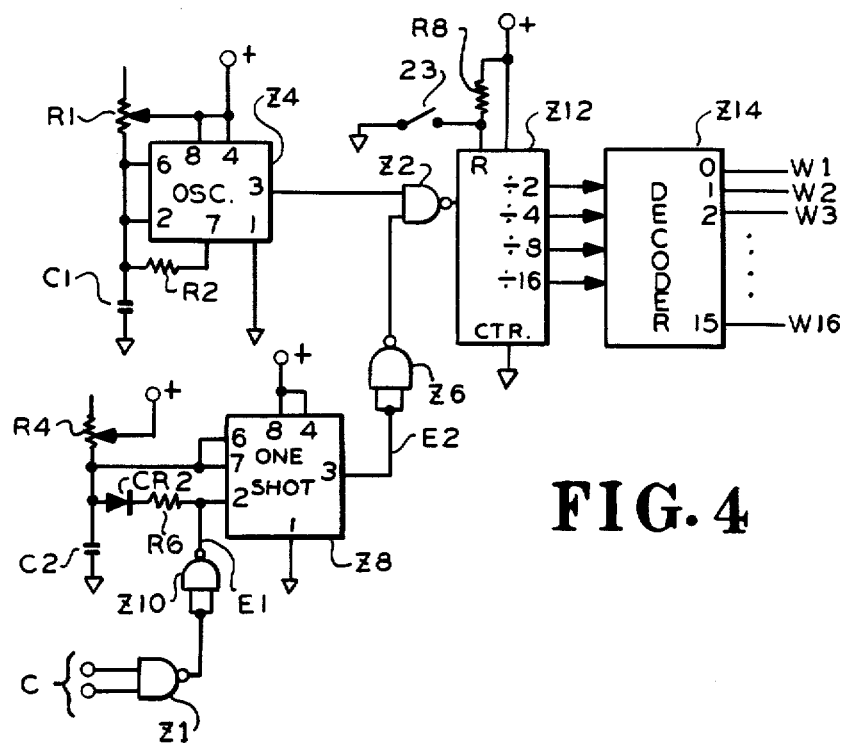
FIG. 4 is a schematic diagram showing the details of the scanner of FIG. 2.

Referring to FIG. 4, it shows in further detail devices 20, 22, 23, 24, Z1 and Z2 of FIG. 2. An oscillator Z4 is formed of integrated timing circuit type 555 manufactured by National Semiconductor. Oscillator Z4 has its terminals 6 and 2 connected to the junction of grounding capacitor C1 and one extreme terminal of potentiometer R1 whose wiper is connected to terminals 4 and 8 of oscillator Z4 and positive potential. Resistor R2 is connected between terminals 2 and 7 of circuit Z4, terminal 1 being grounded. Terminal 3 of circuit Z4 is connected to one input of NAND gate Z2 whose other input connects to the output of NAND gate Z6. Both inputs of gate Z6 are connected to terminal 3 of one shot Z8. Circuit Z8 is also an integrated timer, type 555 manufactured by National Semiconductor. Its terminals 6 and 7 connect to the junction of grounded capacitor C2 and one extreme terminal of potentiometer R4 whose wiper connects to positive potential. Terminals 8 and 4 of circuit Z8 connect to positive potential while terminal 1 is grounded. Resistor R6 is connected between terminal 2 of circuit Z8 and the cathode of diode CR2 whose anode connects to terminal 7. NAND gate Z1 has its separate inputs connected to bus line C and its output connected to both inputs of NAND gate Z10 whose output connects to terminal 2 of circuit Z8.

Counter circuit Z12 is an integrated circuit type 4024 manufactured by National Semiconductor having its reset terminal connected through previously mentioned switch 23 to ground. A pull-up resistor R8 is also connected to terminal R of counter Z12. Counter Z12 has its clock input C driven by the output of NAND gate Z2. The output terminals of counter Z12 are marked 2, 4, 8 and 16 to indicate the set value of each output. These outputs of counter Z12 are applied to decoder Z14 which is a one out of 16 type of decoder, such as type 4514 manufactured by National Semiconductor. Some of the components described above may be selected according to the following table:

TABLE I

| Component | Value/Type |
|---|---|
| Q1 | 2N3904 |
| R1 | 500 Komhs |
| CR2 | 47 Komhs |
| R4 | 500 Komhs |
| R6 | 1.8 Komhs |
| R8 | 10 Komhs |
| C1 | 10 mfd |
| C2 | 10 mfd |
| CR2 | 1N414B |

To facilitate an understanding of the principles associated with the foregoing apparatus its operation will now be briefly described. It is assumed that switch 23 (FIG. 4) is initially closed so that the counter Z12 is reset to produce a 0 output on each of the inputs of decoder Z14. Accordingly, the 0 output of decoder Z14, line W1, is high while all other lines are low. Therefore, a high signal is applied to transistor Q1 (FIG. 2) rendering it conductive and energizing light emitting diode CR1, signifying the the instructor's computer is being serviced. The high signal on line W1 closes the switches S1 so that data lines D1 and control lines C1 of computer of CPM are connected into buses D and C. The data line are so connected that computer CPM may use the interface 12 to access printer 14 and disk drives 16.

It will be assumed that the instructor has ceased using his computer for several minutes so that he has not issued any control requests over line C (FIG. 4). The instructor now opens switch 23 to allow counter Z12 (FIG. 4) to count. Clock Z4 drives counter Z12 with pulses at approximately a 0.325 second repetition rate.

Since it has been assumed that no requests recently issued over lines C (FIG. 4) from the instructor, one shot Z8 will be undisturbed and in its stable state, (astable operation will be described hereinafter). The resulting low signal on terminal 3 (line E2) of circuit Z8 causes gate Z6 to apply a high signal to gate Z2. Consequently, the pulses of clock Z4 are applied to the input C of counter Z12. Accordingly, the binary outputs of clock Z12 will index upward. In response decoder Z14 will sequentially drive each one of its 16 output terminals high for 0.65 seconds (unless the counter Z12 is stopped).

It is assumed that on the next count of counter Z12 a binary output "one" is issued, causing only line W2 to go high. When the switches associated with line W2 (similar to switches S1 of FIG. 2) close no requests issue to lines C (FIG. 4) from the associated computer. Accordingly, one shot Z8 does not change state so that 0.65 seconds later counter Z12 changes to its next state a binary "two". Consequently, decoder Z14 sends only its line W3 to a high state.

It will now be assumed that when the switches associated with line W3 close the associated computer issues a low signal on one of the lines of bus C. Thereafter, gate Z1 (FIG. 4) issues a high signal which is applied through gate Z10 to terminal 2 of one shot Z8. In a well understood manner, one shot Z8 produces a high output on terminal 3 which causes gate Z2 and Z6 to block the pulses from clock Z4. Therefore, counter Z12 ceases counting and remains in a state whereby the relevant computer connected to line W3 continues to be serviced. Accordingly, this computer exchange data through bus D and interface 12 to the printer 14 and disk drive 16. When the request of bus C is applied to terminal 2 of one shot Z8 it quickly discharges capacitor C2 and holds it at a relatively low voltage. The timing relationship between the input E1 and output E2 of one shot Z8 as shown in the two timing diagrams of FIG. 3 indicates that output E2 goes high immediately when input signal E1 falls to a low state. It will be assumed now that the control signals on bus lines C are interrupted, by the relevant computer so that input E1 (FIG. 4) goes high. However, one shot Z8 does not change its high output on line E2 immediately. Instead, capacitor C2 is charged through resistor R4 over approximately a five second interval. Thus, during this five second delay interval (illustrated as interval DT in FIG. 3) the relevant computer may regain access to the peripheral without allowing the counter Z12 to advance to the next computer.

However, it will be assumed now that the relevant computer does not regain control through bus line C so that capacitor C2 rises to a threshold voltage, causing one shot Z8 to return to its stable state. Consequently, line E2 falls to a low state thereby allowing gate Z2 to again pass clock pulses from clock Z4 to counter Z12. Therefore, the counter begins to index through the various computers cycles in the manner just described.

It will be appreciated that at any time an instructor may close switch 23 it causes counter Z12 to reset. When this happens, the strobe line W1 will become high, causing computer CPM (FIG. 4) to gain complete control over the peripherals 12, 14, 16. Also, the instructor may use his switch S2 to send video output from any one of the computers CPM or CP1–CPn to modulator 30. Modulator 30 in a conventional manner modulates the video onto an RF carrier applying this modulated carrier to television CRT and separated audio to earphone 32. Also, the instructor's switch S3 is ganged to audio selector switch S2 to allow him to transmit through microphone 28 and amplifier 26 voice instructions which are applied to the audio input of the computers. Each computer has the ability to process this audio and issue it in the audio channel of a television monitor connected therewith (not shown).

It is to be appreciated that various modifications may be implemented with respect to the above described preferred embodiment. For example, the speed of indexing may be altered depending upon the computer involved. Also, the control lines can be applied to a different combinational logic network depending upon the control signals being issued by the relevant computers. Also, the delays involved with the one shot can be changed. Moreover, one shots need not be used and delayed timing may be obtained from the clock itself. Furthermore, where the computers have their own internal switches for switching the data transmission these switches inside the computer itself may be used instead of those disclosed herein. It will be understood that the number of computers serviced may be varied from the number illustrated herein. Also, various peripheral devices including many different types of memories and output devices may be employed instead of those described herein. Additionally, the equipment supplied to the instructor may be modified to fit the requirements of the user.

Obviously, many modifications and variations of the present invention are possible in light of the above teachings. It is, therefore, to be understood that within the scope of the appended claims, the invention may be practiced otherwise than as specifically described.

What is claimed is:

1. A non-random network for connecting a common peripheral device to one of a plurlity of computers, each having a request line for providing a request signal, comprising:

a plurality of switching means each coupled to said common peripheral device and to a corresponding one of said computers, each of said switching means being operable in response to a select signal being applied thereto to transfer data between its corresponding one of said computers and said common peripheral device; and scanning means coupled to said plurality of switching means for enabling them in a predetermined order to transfer said data by sequentially applying to them said select signal, said scanning means being coupled to said request line of each of said computers and being responsive to the presence thereupon of said request signal, said scanning means being operable to cease sequencing and to continue applying said select signal to a chosen one of said plurality of switching means that is coupled to a selected one of said computers in response to the request signal from said selected one of said computers, the select signal applied to the chosen one of said plurality of switching means being terminated in response to termination of the request signal from the selected one of said computers, after terminating the select signal said scanning means being operable to restore the select signal to the same one of said switching means only after each of the other ones of said switching means has had temporarily applied to it by said scanning means said select signal.

2. A non-random network according to claim 1 wherein each of said plurality of switching means includes:
  data means for switching data between its corresponding one of said computers and said common peripheral device in response to receipt of said select signal; and
  control means connected between said scanning means and the corresponding one of said computers for switching the request signal of the latter to said scanning means in response to receipt of said select signal.

3. A non-random network according to claim 2 wherein said scanning means comprises:
  delay means coupled to each of said control means for receiving the request signal switched thereby and for providing a stretched signal having a duration persisting beyond that of each request signal received by said delay means;
  a clock; and
  a counter driven by said clock and operable during the absence of said stretched signal to index sequentially to each of said switching means and to each said select signal.

4. A non-random network according to claim 3 wherein said counter includes:
  a manual override switch coupled to said counter for driving it to a predetermined state so that a predetermined one of said computers has exclusive use of said common peripheral.

5. A non-random network according to claim 4 wherein each of said computers has an audio input and video output, said network further comprising:
  a video monitor; and
  a video selector coupled to said monitor and the video output of each of said computers for displaying the video output of a selected one of said computers on said monitor.

6. A non-random network according to claim 5 further comprising:
  a microphone; and
  an audio selector coupled to said microphone and the audio input of each of said computers for providing audio to a selected one of said computers.

7. A non-random network according to claim 6 wherein said scanning means further comprises:
  a decoder means coupled to said counter for converting its count into a one out of n code.

8. An educational computer system having a common peripheral device and a plurality of computers, each having a request line for providing a request signal and each having a video output, one of said computers being a master computer the others being student computers, comprising:
  a plurality of switching means each coupled to said common peripheral device and to a corresponding one of said computers, each of said switching means being operable in response to a select signal being applied thereto to transfer data between its corresponding one of said computers and said common peripheral device;
  scanning mean s coupled to said plurality of switching means for enabling them in a predetermined order to transfer said data by sequentially applying to them said select signal, said scanning means being coupled to said request line of each of said computers and being responsive to the presence thereupon of said request signal, said scanning means being operable to cease sequencing and to continue applying said select signal to a chosen one of said plurality of switching means that is coupled to a selected one of said computers in response to the request signal from said selected one of said computers, the select signal applied to the chosen one of said plurality of switching means being terminated in response to termination of the request signal from the selected one of said computers, after terminating the select signal said scanning means being operable to restore the select signal to the same one of the switching means only after each of the other ones of said switching means has had temporarily applied to it by said scanning means said select signal; and
  a master console including:
  a video monitor;
  a video selector coupled to said monitor and the video output of each of said computers for displaying the video output of a selected one of said computers on said monitor; and
  a manual override switch coupled to said scanning means for driving it to a predetermined state in which the master computer has exclusive use of said common peripheral.

9. A method for non-randomly connecting a common peripheral device to one of a plurality of computers, each having a request line for providing a request signal, comprising the steps of:
  sequentially sensing the request line of each of said computers in a predetermined order;
  stopping the sequential sensing when a next sensed request line of one of said computers issues the request signal so that the request signal of every other one of the computers is ignored, said sequential sensing ceasing for at least as long as the duration of the request signal;
  connecting that one of said computers having said next sensed request line to said common peripheral for at least the time needed to complete current use of said common peripheral, the connection time being computer-determined; and
  continuing the sequential sensing of the request line of each of the computers, sensing every other one of the computers for a request signal before again sensing the request line of that one of said computers having said next sensed request line.

10. A method according claim 9 wherein the step of connecting said common peripheral to that one of said computers having said next sensed request line persists throughout the duration of its request signal and for a predetermined waiting interval immediately thereafter.

* * * * *